United States Patent
McBrayer et al.

(10) Patent No.: US 8,235,774 B2
(45) Date of Patent: Aug. 7, 2012

(54) POULTRY WING PORTIONER

(76) Inventors: Donald Edward McBrayer, Boaz, AL (US); Kent Eugene Basson, Falls Church, VA (US)

( * ) Notice: Subject to any disclaimer, the term of this patent is extended or adjusted under 35 U.S.C. 154(b) by 0 days.

(21) Appl. No.: 12/931,703

(22) Filed: Feb. 9, 2011

(65) Prior Publication Data

US 2011/0237172 A1  Sep. 29, 2011

Related U.S. Application Data

(60) Provisional application No. 61/341,269, filed on Mar. 29, 2010.

(51) Int. Cl.
*A22C 18/00* (2006.01)
(52) U.S. Cl. ....................................................... 452/149
(58) Field of Classification Search .............. 452/82–85, 452/94, 95, 125, 129, 130, 149, 166, 169, 452/170, 150, 151, 153–155
See application file for complete search history.

(56) References Cited

U.S. PATENT DOCUMENTS

| | | | |
|---|---|---|---|
| 4,207,653 A | 6/1980 | Gasbarro | |
| 4,935,990 A * | 6/1990 | Linnenbank | 452/167 |
| 5,078,644 A | 1/1992 | DiGerlando | |
| 5,080,631 A | 1/1992 | Howard et al. | |
| 5,494,479 A * | 2/1996 | Lindert et al. | 452/135 |
| 5,496,210 A | 3/1996 | Davis | |
| 7,335,095 B2 * | 2/2008 | Sekiguchi et al. | 452/169 |
| 7,341,505 B1 * | 3/2008 | Gasbarro | 452/169 |
| 7,530,888 B2 * | 5/2009 | Annema et al. | 452/167 |
| 7,597,615 B2 * | 10/2009 | van den Nieuwelaar et al. | 452/182 |
| 7,824,251 B2 * | 11/2010 | van den Nieuwelaar et al. | 452/185 |

* cited by examiner

*Primary Examiner* — Richard Price, Jr.

(57) ABSTRACT

A poultry wing portioner is provided for separating poultry wings. The portioner includes a loop conveyor, a wing holder, a circular saw, and driving means for the loop conveyor and the circular saw. The portioner is configured to allow a user to place poultry wings onto the holder, which is conveyed past the circular saw. The circular saw cuts poultry wings into the portions of a drumette, a midwing, and a wingtip.

19 Claims, 9 Drawing Sheets

POULTRY WING PORTIONER

RELATED APPLICATIONS

This application claims the benefit of U.S. Provisional Application No. 61/341,269 filed Mar. 29, 2010

FIELD OF THE INVENTION

This invention relates to a machine for separating sections of a poultry wing.

BRIEF SUMMARY OF THE INVENTION

The invention is an apparatus for cutting a poultry wing, the poultry wing having a drumette portion, a midwing portion, and a wingtip portion. The apparatus may comprise a wing holder for receiving wings, with each wing holder adapted to receive a poultry wing; a continuous loop conveyance device for moving the wing holders through a continuous path, with the wing holder mounted on the continuous loop device; a first driving means for driving the continuous loop conveyance device; a first circular saw for cutting the joint between the drumette portion and the midwing portion; a second circular saw for cutting a joint between the midwing portion and the wingtip portion; a second driving means for rotating the first circular saw and the second circular saw; and an alignment device forming a corridor for aligning the poultry wing on the wing holder prior to the joint between the drumette portion and the midwing portion being cut.

The invention is an apparatus for cutting a poultry wing, the poultry wing having a drumette portion, a midwing portion, and a wingtip portion. The apparatus may comprise a wing holder for receiving wings, with each wing holder configured to receive a poultry wing; a continuous loop conveyance device for moving the wing holder through a continuous path, wherein the wing holder is mounted on the continuous loop device; a first driving means for driving the continuous loop conveyance device; a first circular saw for cutting the joint between the drumette portion and the midwing portion; a second circular saw for cutting a joint between the midwing portion and the wingtip portion; a second driving means for rotating the first circular saw and the second circular saw; an alignment device forming a corridor for aligning the poultry wing on the wing holder prior to the joint between the drumette portion and the midwing portion being cut.

The invention is an apparatus for cutting a poultry wing, the wing having a drumette portion, a midwing portion, and a wingtip portion. The apparatus may comprise a wing holder for receiving wings, each wing holder adapted to receive a poultry wing; a continuous loop conveyance device for moving the wing holders through a continuous path, wherein the wing holder is mounted on the continuous loop device; a first driving means for driving the continuous loop conveyance device; a first circular saw for cutting the joint between the drumette portion and the midwing portion; a second driving means for rotating the first circular saw; a second circular saw for cutting a joint between the midwing portion and the wingtip portion; a third driving means for rotating the second circular saw; a first alignment device forming a corridor for aligning the poultry wing on the wing holder prior to the joint between the drumette portion and the midwing portion being cut.

DETAILED DESCRIPTION OF THE INVENTION

Figure 1:
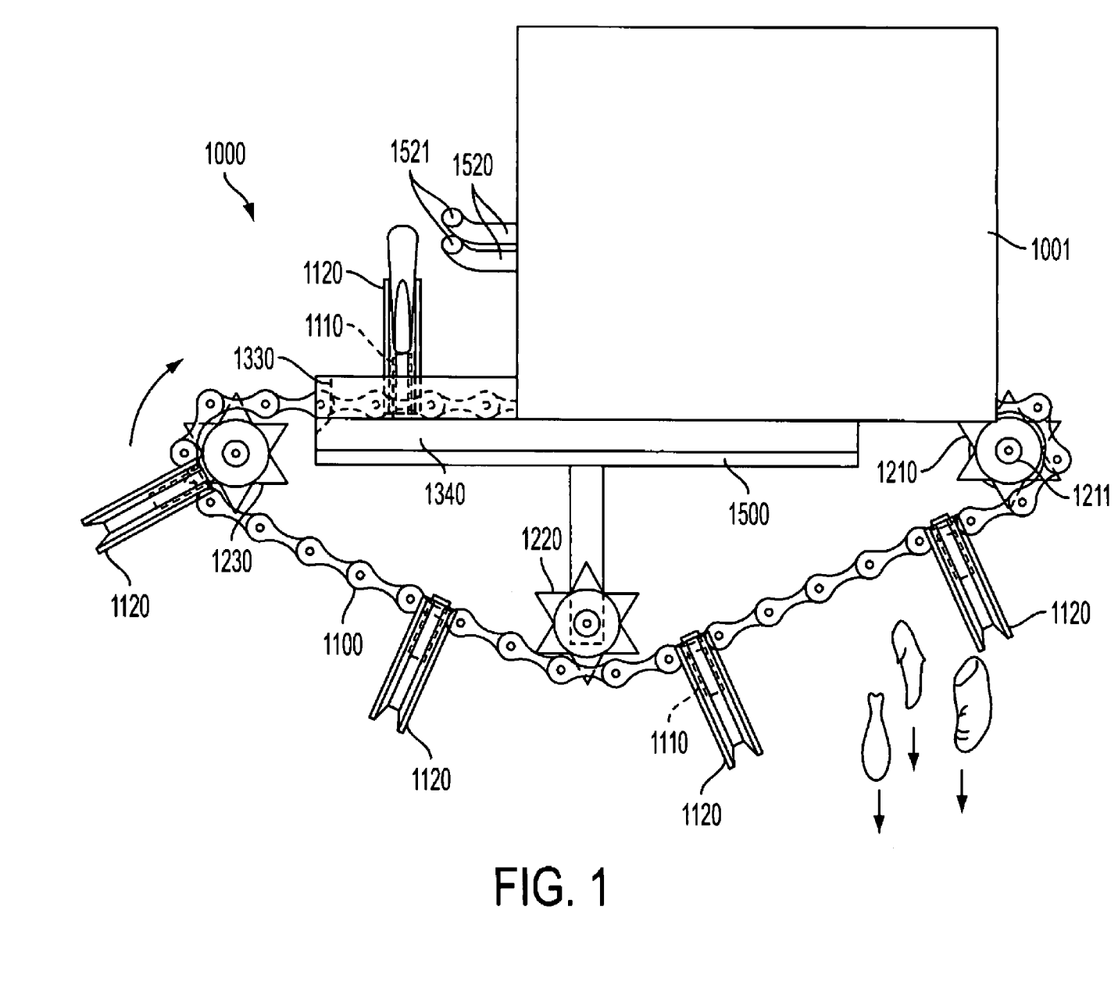
FIG. 1 is a side view illustrating a poultry wing portioner.
Figure 2:
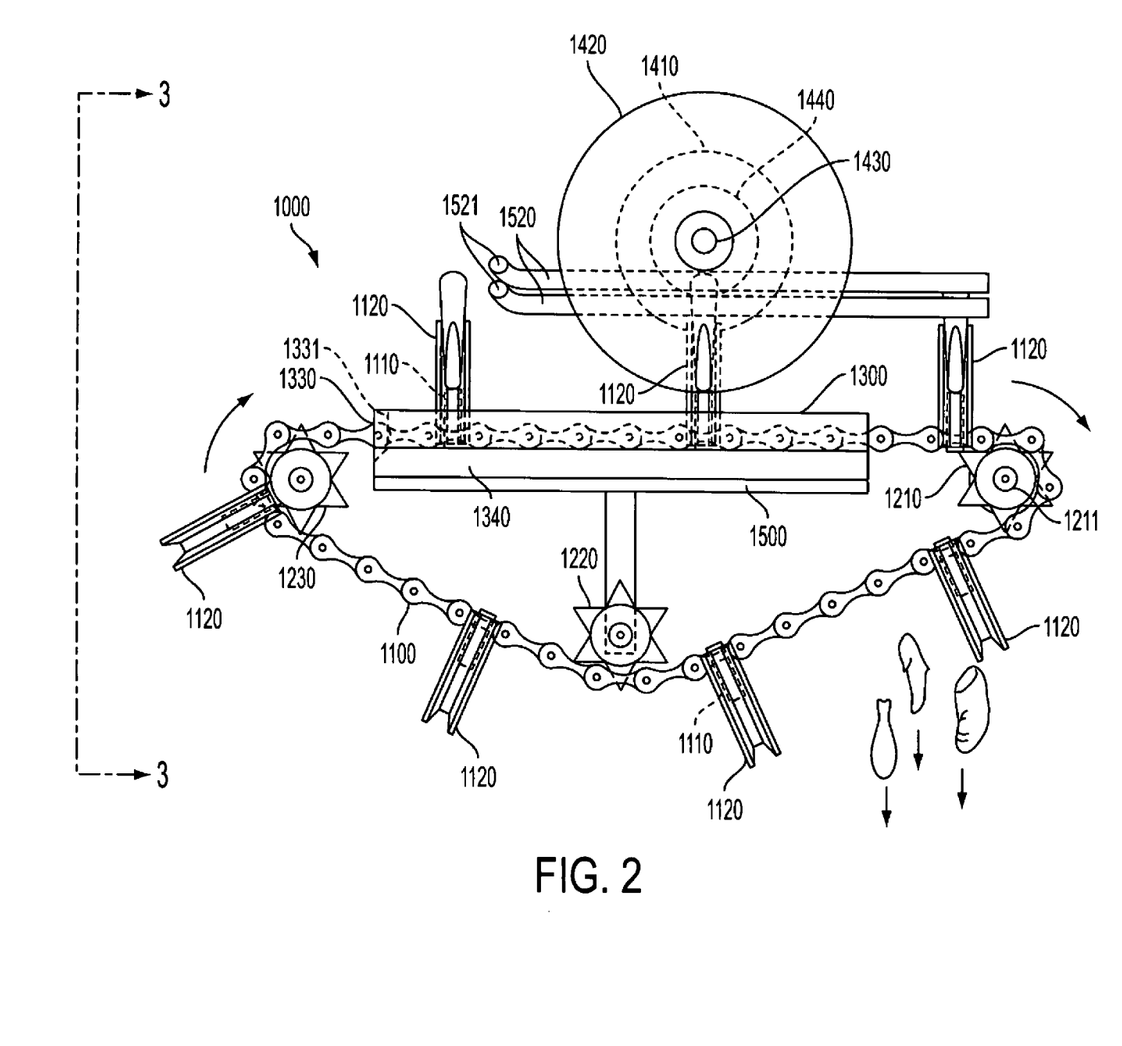
FIG. 2 is a closer side view of the poultry wing portioner shown in FIG. 1 with protective covers removed to make the underlying parts visible.

FIG. 1 shows an embodiment 1000 of a poultry wing portioner including a safety cover 1001 and assorted safety devices for protection of an operator and other personnel working near portioner 1000. Portioner 1000 is shown in FIG. 2 with the cover 1001 and safety measures removed for better visibility. Of course, during operation, the cover 1001 and safety devices may be installed as shown in FIG. 1, but have been removed to provide a better description of elements directly related to the function of portioner 1000.

Figure 3:
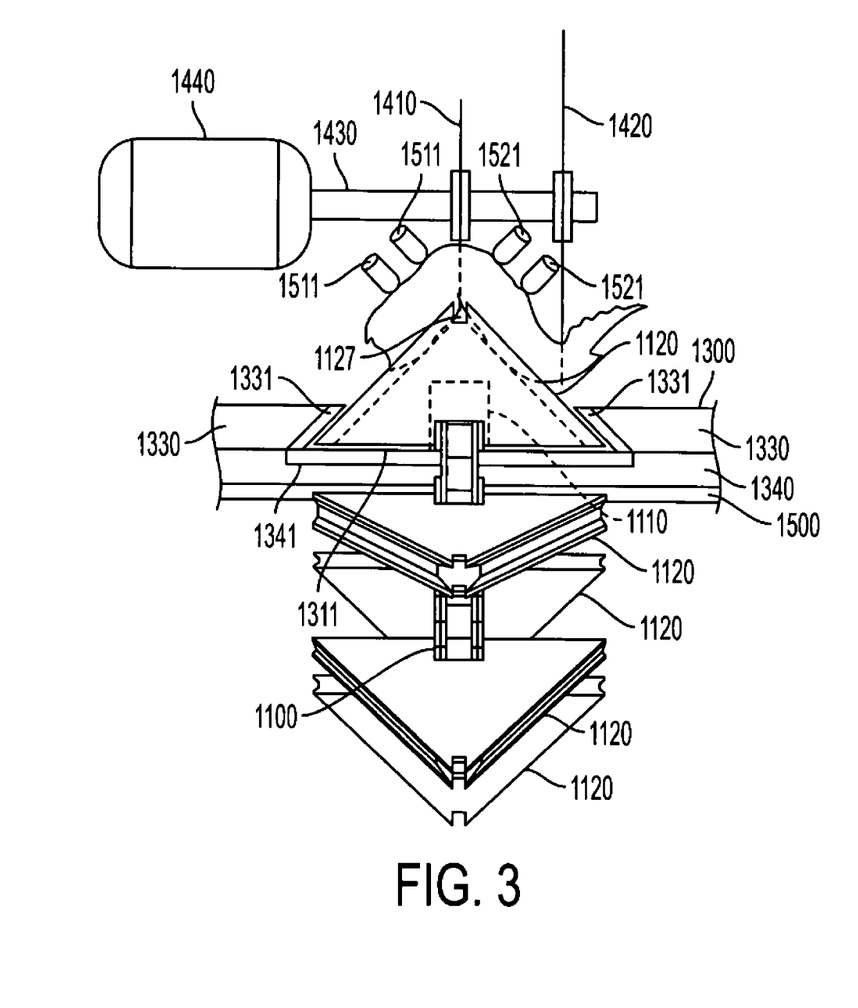
FIG. 3 is an end view of the poultry wing portioner as shown in FIG. 2.
Figure 4:
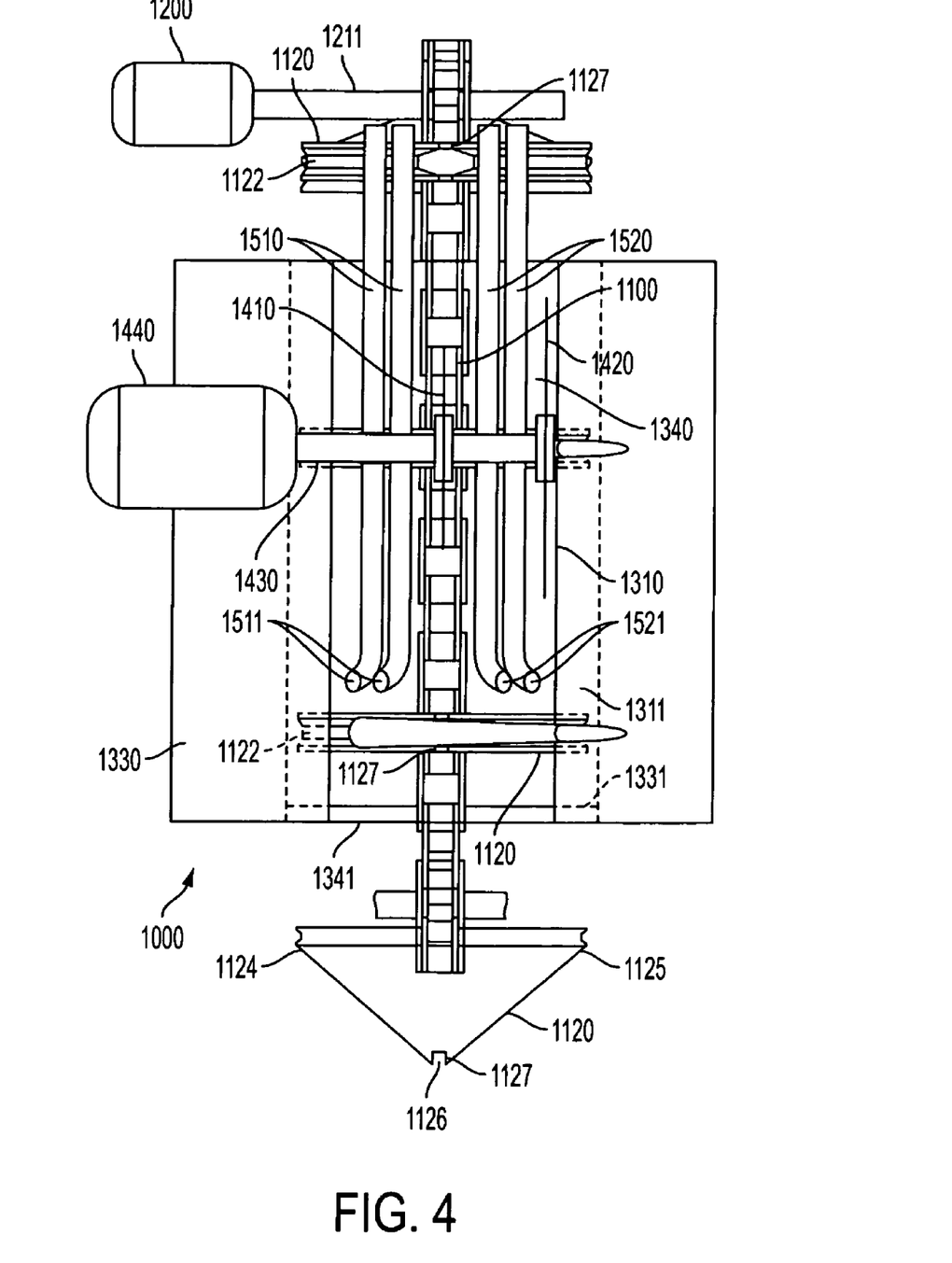
FIG. 4 is a top view of the poultry wing portioner as shown in FIG. 2.

FIGS. 2-4 show a first embodiment 1000 of the portioner. Portioner 1000 may comprise a rigid frame 1500 to support other components of portioner 1000, a continuous loop conveyor device such as a chain 1100 to propel a plurality of wing holders 1120, a motor 1200 to drive chain 1100, a motor 1440 to drive shaft 1430, onto which a first circular saw blade 1410 and a second circular saw blade 1420 are mounted. First circular saw blade 1410 separates drumette sections from midwing sections of poultry wings as the poultry wings placed on wing holders 1120 by an operator pass saw blade 1410. Second circular saw blade 1420 separates midwing sections from wingtip sections of poultry wings as the poultry wings placed on wing holders 1120 by an operator pass saw blade 1420.

Both motor 1200 and motor 1440 may be electric motors, but may be any type of motor or other device suitable for driving chain 1100 and saw blades 1410 and 1420. As an alternative to electric motors, the drive devices for chain 1100, and saw blades 1410 and 1420 may be chosen from a group including, but not be limited to, hydraulic drives, gas motors, and steam turbines. All embodiments of the portioner will be described as having electric motors to drive the continuous loop conveyor and saw blades. A person of ordinary skill in the art will understand that a variety of drive systems may be used for driving chain 1100, and for driving saw blades 1410 and 1420.

Motor 1440 may be mounted to allow variation of the height and angle of circular saws 1410 and 1420 such that the cuts of the joints of the poultry wings may be optimized. Arbors holding circular saws 1410 and 1420 may have various lengths to adjust the horizontal locations of circular saws 1410 and 1420 along their axis.

While a variety of continuous loop conveyor devices may be used, the description below will describe all embodiments of the portioner as having a chain used for that function. The chain may be made from stainless steel, food grade plastic, or any other material or combination of materials suitable for the purpose. A person of ordinary skill in the art will understand that a variety of devices could be used as a continuous loop conveyor device in the place of chain 1100 to move wing holders 1120 past saw blades 1410 and 1420. The alternatives to a chain may include, but not be limited to, belts.

Mounting tabs 1110 may be attached to some of the links of chain 1100. Mounting tabs 1110 may be attached to links of chain 1100 by welding, brazing, soldering, pinning, screwing or any other method known in the art.

Figure 6:
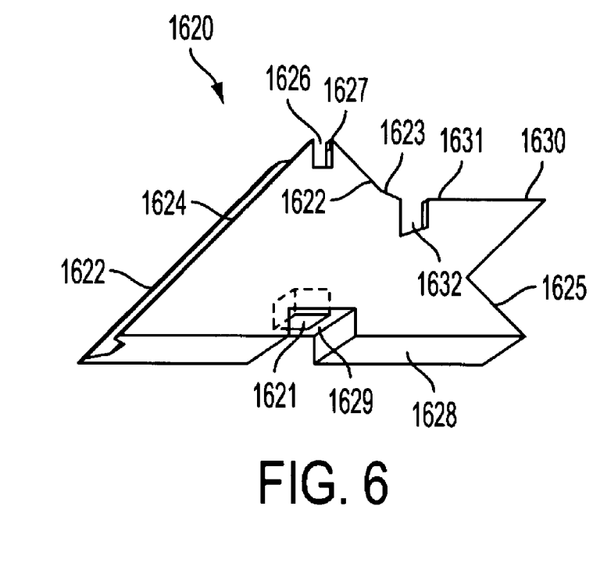
FIG. 6 is a detail of an alternative wing holder for the poultry wing portioner shown in FIGS. 1-4.

As illustrated in FIG. 2, a plurality of wing holders 1120 may be mounted on mounting tabs 1110 of chain 1100, while chain 1100 may be accommodated in chain slots 1129 of wing holders 1120 (see FIG. 6). Chain 1100 may be driven by sprocket 1210 mounted on shaft 1211 of motor 1200. Chain 1100 may also ride on one or more idler sprockets 1220 and 1230. Drive sprocket 1210 may be alternatively be located in the position shown in FIG. 2 for either idler sprocket 1220 or 1230, with an idler sprocket located in the position shown in FIG. 2 for drive sprocket 1210.

Wing holders 1120 may be driven by chain 1100 as chain 1100 rotates in a clockwise direction as shown in FIG. 2. Idler sprocket 1230 may be considered to be located on the upstream side of portioner 1000, with drive sprocket 1210 considered to be located on the downstream side of portioner 1000.

Wing holders 1120 may be mounted on tabs 1110 by any means known in the art including, but not limited to, set screws, pins and/or adhesives. Wing holders 1120 may have mounting slots 1121 to facilitate installation of wing holders 1120 on tabs 1110.

Figure 5:
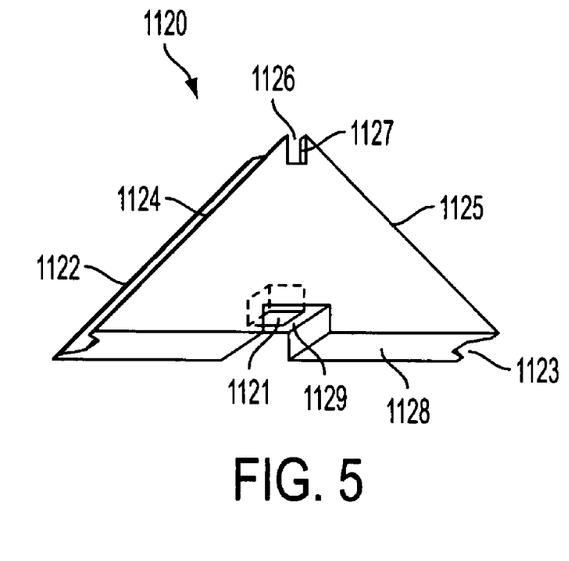
FIG. 5 is a detail of a wing holder for the poultry wing portioner shown in FIGS. 1-4.

As shown in FIG. 5, wing holders 1120 may have a triangular shape with drumette grooves 1122 and midwing grooves 1123 on legs 1124 and 1125, respectively, adapted to receive poultry wings placed individually on wing holders 1120 by an operator of portioner 1000. A single poultry wing may be loaded onto a wing holder 1120 with the crotch of the joint between the drumette portions and the midwing portions (hereinafter known as the "first joint") located at apex 1126 of wing holder 1120. Drumette portions and midwing portions may be received in drumette groove 1122 and midwing groove 1123, respectively, of wing holders 1120, with wingtip portions extending at roughly a right angle from midwing portions of poultry wings resting in midwing grooves 1123.

Drumette grooves 1122 and midwing grooves 1123 may extend the entire lengths of legs 1124 and 1125, respectively, to make fabrication of wing holders 1120 simpler. Alternatively, drumette grooves 1122 and midwing grooves 1123 may end short of bottom surfaces 1128 of wing holders 1120 to enhance durability of wing holders 1120 where they come into contact with track 1310, described below.

Grooves 1122 and 1123 may be of constant width or may have a shape and size roughly corresponding to the shapes of the wing portions. For example, drumette grooves 1122 may have an enlarged lower portion to better accommodate the shape of the drumette portions. Undercut grooves to facilitate rotation of the midwing after the drumette is severed from the midwing.

Alternatively, as shown in FIG. 6, wing holder 1620 may have one or more wingtip legs 1630 extending outside the basic triangular shape with a wingtip groove 1631 in wingtip leg 1630 for receiving a wingtip portion of a poultry wing. As with grooves 1122 and 1123, wingtip groove 1631 may be shaped and sized to better accommodate the shape of wingtip portions.

Optimal angles of the surfaces of wing holders 1120 and 1620 may be determined by routine experimentation. Wing holders 1120 and 1620 may be made of food grade plastic or any other material, including but not limited to stainless steel, suitable for use with commercial food applications.

Saw passage slots 1127 and 1627 may be located at or near apices 1126 and 1626 of wing holders 1120 and 1620, respectively. Saw passage slots 1632 may be located near where the joints between midwing portions and wingtip portions may be located when an operator places poultry wings onto wing holders 1620. Saw passage slots 1627 and 1632 may provide passage for circular saws 1410 and 1420, respectively, as wing holders 1620 are driven past the saws and the joints between wing portions are cut.

The width of saw passage slots 1127, 1627, and 1632 may vary depending on whether the cutting angles and/or horizontal locations of circular saws 1410 and/or 1420 are varied.

Drumette grooves 1622 of wing holders 1620, as with drumette grooves 1122 of wing holders 1120, may extend the entire length of drumette leg 1624. Midwing groove 1631, on the other hand, may end at saw passage slot 1632 rather than extending the entire length of midwing leg 1625.

A table 1300 of food grade plastic or any other material suitable for the purpose may be mounted upon frame 1500. Table 1300 may comprise a dovetail track 1310 for receiving chain 1100 and a portion of wing holders 1120, with bottom surfaces 1128 of wing holders 1120 riding on a floor 1311 of dovetail track 1310. Although wing holders 1120 may be generally triangular in shape as shown in FIG. 5, they may be other shapes that are appropriate for receiving poultry wings and riding in track 1310, with track 1310 matching a shape of a lower portion of wing holders 1120 to provide a steadying effect on the travel of wing holders 1120 within track 1310 of table 1000.

One or both ends of track 1310 may include beveled or rounded areas to facilitate entry and/or exit of wing holders 1120 into and/or out of track 1310. Edges of wing holders 1120 that come into contact with track 1310 may be rounded or beveled instead of, or in addition to, beveling and rounding of one or both ends of track 1310.

Table 1300 may comprise two upper slabs 1330 and a lower slab 1340. Upper slabs 1330 may be cut at an angle and placed apart from each other on top of lower slab 1340 to form track 1310. This arrangement may provide for easier fabrication of table 1300 and track 1310 than using a single slab and cutting track 1310 into that slab. Upper and lower slabs 1330 and 1340 may be fabricated from a food grade plastic or any other material suitable for such purposes.

The upstream end of lower slab 1340 may have a beveled surface 1341 to help guide wing holders 1120 into track 1310. Upper slabs 1330 may also have beveled surfaces 1331 to help guide wing holders 1120 into track 1310.

An operator of portioner 1000 may place poultry wings on wing holders 1120 as wing holders 1120 are driven across table 1300 in a direction away from the operator. Poultry wings may be carried by wing holders 1120 into a region covered by alignment guides 1510 and 1520. Alignment guides 1510 and 1520 may be round bars approximately parallel to drumette sides 1124 and midwing sides 1125 of wing holders 1120, respectively. Alternatively, alignment guides 1510 and 1520 may be flat bars, contoured plates, or any other shape that functions to align poultry wings on wing holders 1120 to optimize cutting. Alignment guides 1510 and 1520 may include inclined portions 1511 and 1521, respectively, to direct poultry wings under guides 1510 and 1520 as chain 1100 and wing holders 1120 carry poultry wings downstream to be cut by circular saw blades 1410 and 1420. Alignment guides 1510 and 1520 may assist in keeping poultry wings optimally located for cutting by saw blades 1410 and 1420.

Alignment guides 1510 and 1520 may be adjustable in elevation. For example, they may be mounted by an adjustable threaded connection. Alternatively, or in addition to, being adjustable in elevation, alignment guides 1510 and 1520 may be spring mounted to accommodate variations in the size of poultry wings. If spring mounted, all guides 1510, 1520 may be mounted either individually or separately.

Wingtip portions may be allowed to fall into an opening (not shown) in the vicinity of saw blade 1420 after being separated from midwing portions. Drumette portions and midwing portions may have openings in table 1300 into which they fall or, alternatively, one or both the drumette portions and midwing portions may be conveyed to the end of table 1300 where chain 1100 rounds drive sprocket 1210 where the wing portions fall off wing holders 1120 into containers or onto conveyors for packaging or further processing.

In an embodiment in which table 1300 has holes into which poultry wing portions fall, alignment guides 1510 and 1520 may terminate just downstream of the area where circular saw blades 1410 and 1420 cut the poultry wings. In an embodiment in which poultry wing portions fall off wing holders 1120 where chain 1100 winds around drive sprocket 1210, alignment guides may extend to a downstream end of table 1300.

Figure 7:
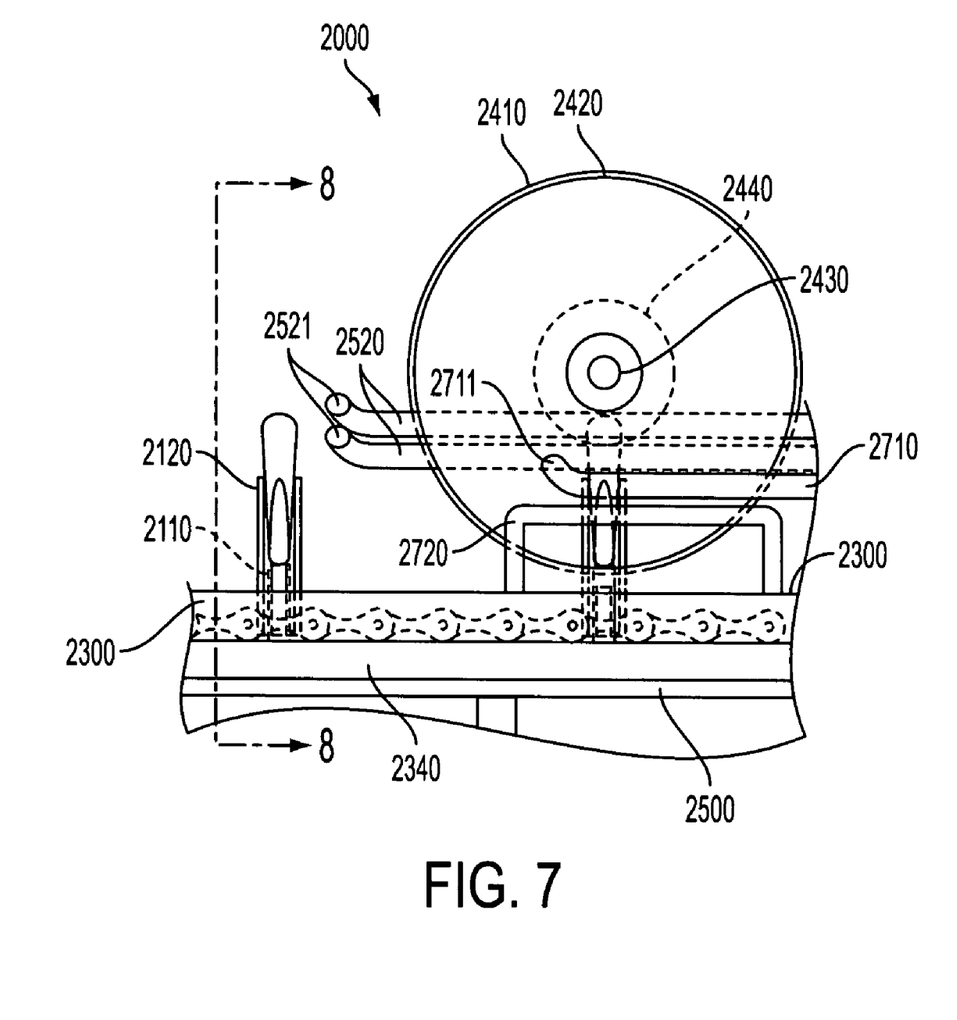
FIG. 7 is a detail of a second embodiment of the wing portioner.
Figure 8:
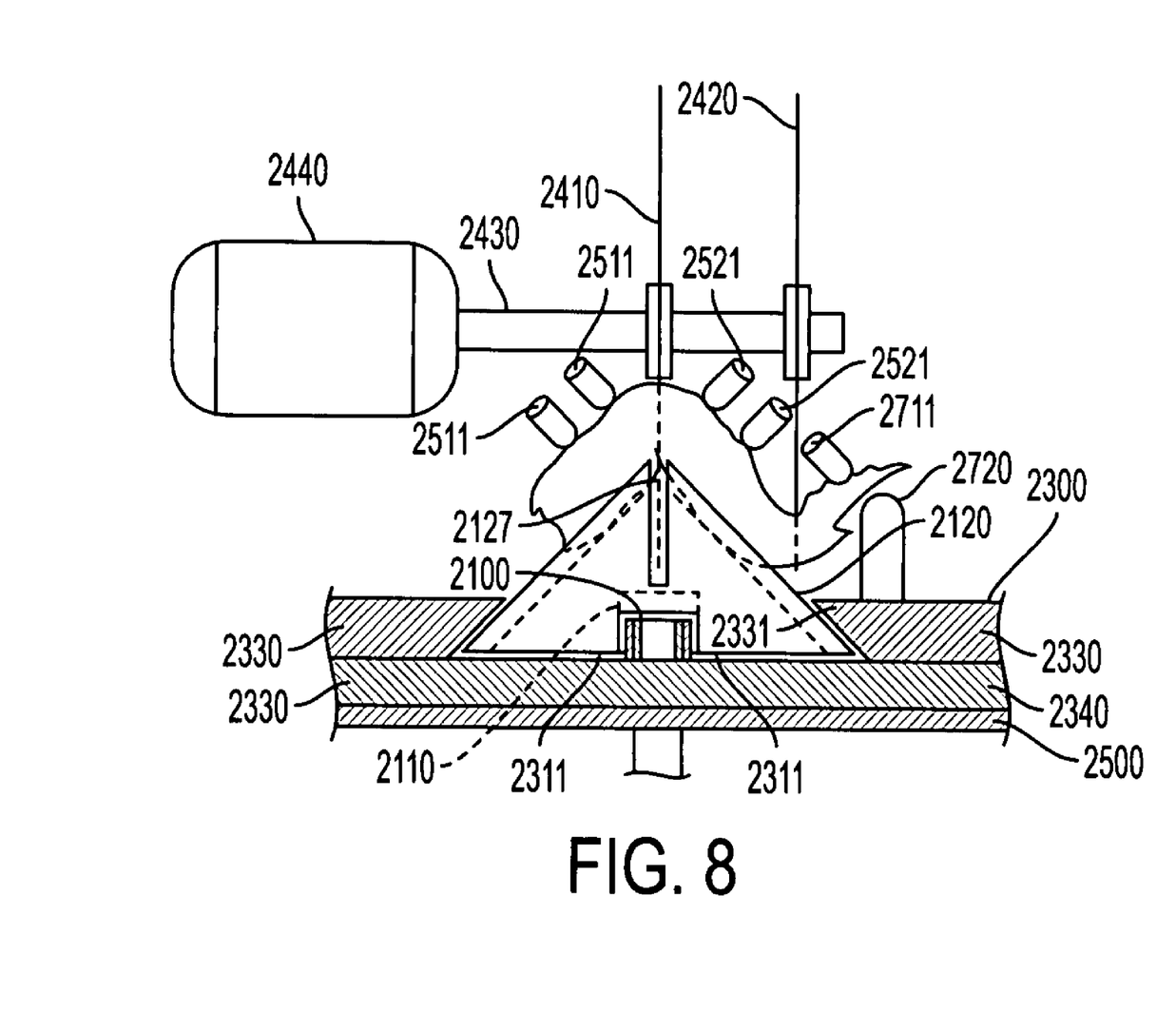
FIG. 8 is a section view of the detail shown in FIG. 7 looking downstream of the portioner.

FIGS. 7 and 8 show details of the area where poultry wings may be cut for a second embodiment 2000 of the portioner. This embodiment may allow for variations in the lengths of midwing portions of poultry wings. The general operation of portioner 2000 may be similar to that of the first embodiment 1000 described above. Similarly numbered components may have the same design and function for both the first and second embodiments of the portioner.

Whereas portioner 1000 may cut the two joints of poultry wings virtually simultaneously, portioner 2000 first cuts the joint between drumette portion and midwing portion, and then cuts the joint between the midwing portion and the wingtip portion. Portioner 2000, like portioner 1000, may have both saw blades 2410 and 2420 driven by a single motor 2140.

While portioner 1000 may have saw blades 1410 and 1420 sized in a way that poultry wing portions are separated by contacting a lower portion of saw blades 1410 and 1420, portioner 2000 may have an oversized saw blade 2410 (and corresponding deeper saw passage slots 2127) for cutting the joints between midwing portions and wingtip portions of poultry wings. Due to the curvature of the saw blades 2410 (behind saw blade 2420 in drawing and of similar size to saw blade 2420) and 2420, as shown in FIG. 7, drumette portions may be separated from midwing portions before midwing portions are separated from wingtip portions even though circular saws 2410 and 2420 may be mounted on a common shaft driven by motor 2440.

After a drumette portion is separated from a midwing portion, the unseparated midwing portion and wingtip portions may drop under the force of gravity and/or be forced by wingtip alignment guide pair 2710/2720 to a lower position in relation to wing holders 2120. This may provide a uniform location for separating wingtip portions from midwing portions, thus accounting for variations in lengths of midwings. Alignment guide 2520 may extend just past the point at which wingtip portions are cut from midwing portions as shown in FIG. 7.

Upper wingtip guide 2710 may include an inclined front portion 2711 to contact the wingtip portion of the poultry wing to guide the wingtip portion to lower wingtip guide 2720. This guiding of the wingtip portion of the poultry wing to the lower wingtip guide 2720 may place the joint between the midwing portion and the wingtip portion in an optimal position for cutting by circular saw 2420.

If alternative wing holder 1620 shown in FIG. 6 is used, lower wingtip guide 2720 may not be required because the leg of wing holder 1620 may be configured to receive the wingtip portion and serve the same function as lower guide 2720.

Figure 9:
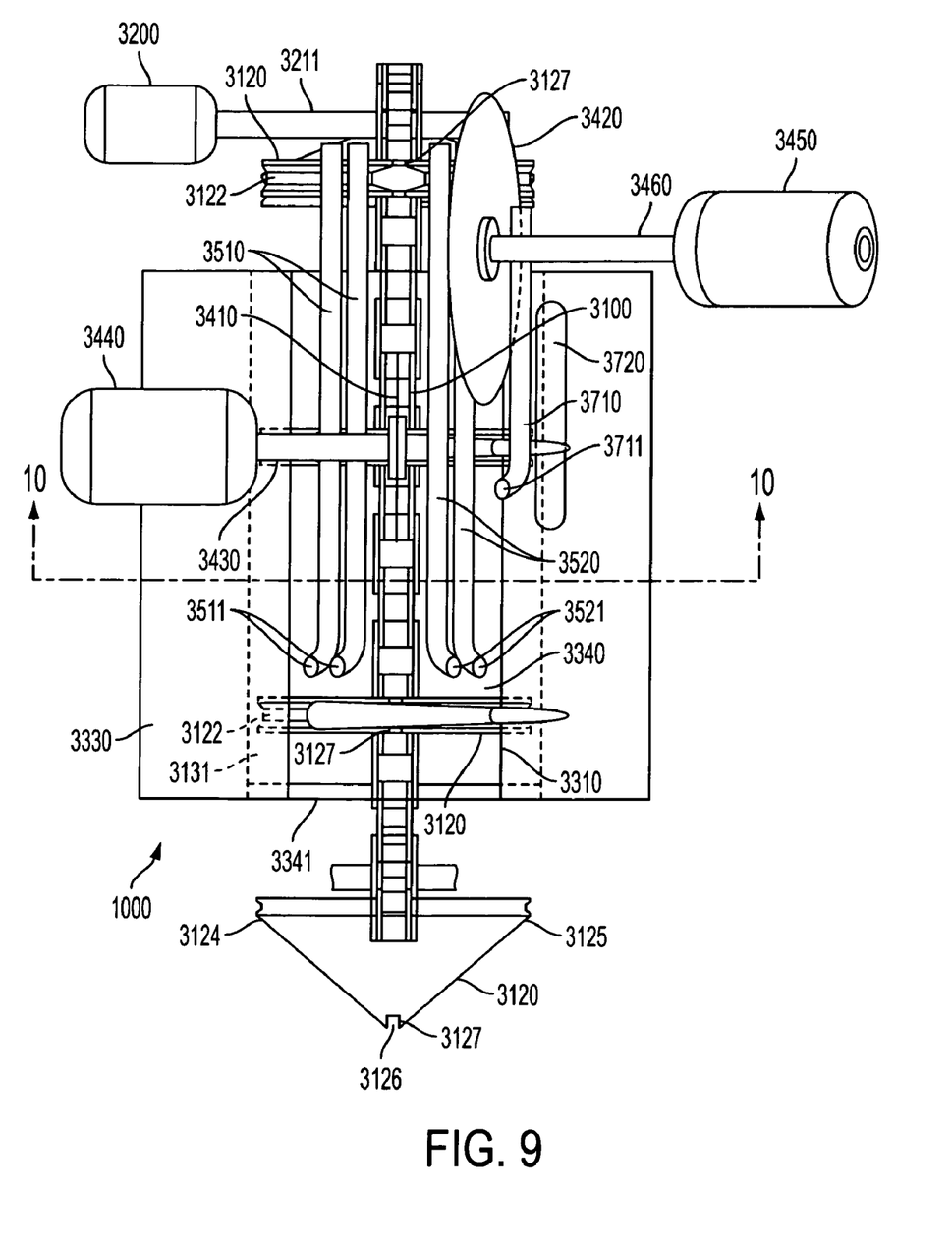
FIG. 9 is a top view of a third embodiment of the wing portioner.
Figure 10:
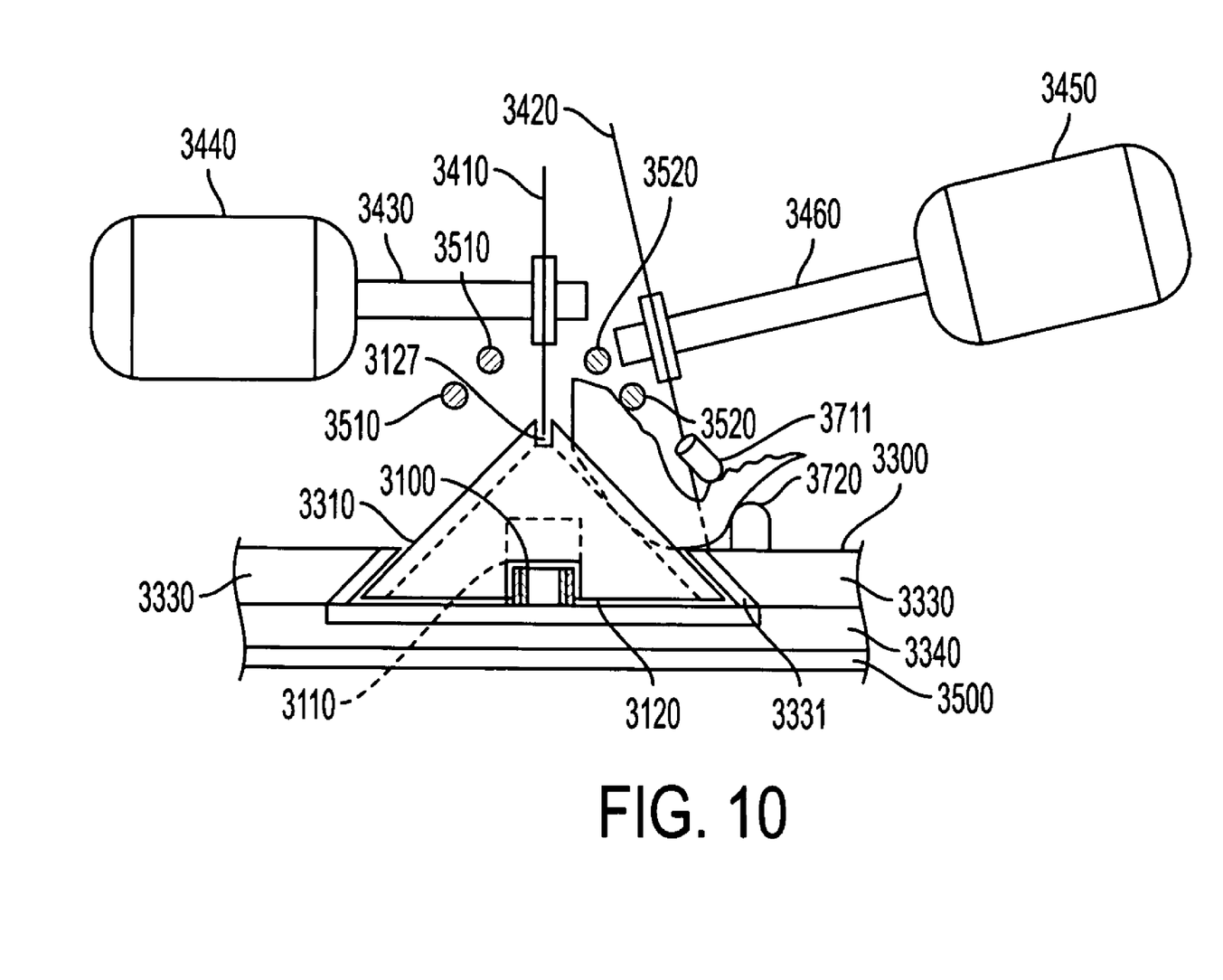
FIG. 10 is a section view of the wing portioner shown in FIG. 9.

As shown in FIG. 9, a third embodiment 3000 of the portioner may have motor 3440 for driving saw blade 3410 and motor 3450 for driving saw blade 3420 mounted on shaft 3460. The general operation of portioner 2000 may be similar to that of the first embodiment 1000 described above. Similarly numbered components may have the same design and function for all three embodiments of the portioner. Poultry wings may be conveyed first past circular saw 3410 for cutting of the joint between the drumette portion and the midwing portion, with chain 3000 then conveying the poultry wings past circular saw 3420 for cutting of the joint between the midwing portion and the wingtip portion. The height, horizontal location, and angle of circular saw 3420 may be adjusted to optimize the cut between the midwing portion and the wingtip portion.

After a drumette portion is separated from a midwing portion, the unseparated midwing portion and wingtip portions may drop under the force of gravity and/or be forced by wingtip alignment guide pair 3710/3720 to a lower position in relation to wing holders 3120. This may provide a uniform location for separating wingtip portions from midwing portions, thus accounting for variations in lengths of midwings. Alignment guide 3520 may extend just past the point at which wingtip portions are cut from midwing portions as shown in FIG. 9.

Upper wingtip guide 3710 may include an inclined front portion 3711 to contact the wingtip portion of the poultry wing to guide the wingtip portion to lower wingtip guide 3720. This guiding of the wingtip portion of the poultry wing to the lower wingtip guide 3720 may place the joint between the midwing portion and the wingtip portion in an optimal position for cutting by circular saw 3420.

If alternative wing holder 1620 shown in FIG. 6 is used, lower wingtip guide 3720 may not be required because the leg of wing holder 1620 is configured to receive the wingtip portion may serve the same function as lower guide 3720.

There may be any number of methods for ensuring that the drumette portions, the midwing portions, and the wingtip portions of poultry wings are channeled to the correct containers and/or conveyors after the poultry wings are cut. Drumette portions may fall into an opening (not shown) through table 1300, 2300, or 3300 on the drumette side of the wing holders. A means for segregating the severed midwing portions and wingtip portions is shown in FIG. 11.

Although the above method of segregating midwing portions from wingtip portions is described with reference to first embodiment 1000 of the poultry wing portioner, similar means may also be used with second and third embodiments of the poultry wing portioner.

If segregation of midwings and drumettes is not required, a mirror image saw and wingtip alignment guide arrangement may be added. This arrangement may allow an operator of the portioner to place wings on the wing holders in two different orientations. Such an option may save an operator time by allowing the operator to avoid reorienting wings as often as if the wings always had to be placed on the wing holders oriented in the same way.

Safety devices may be installed including, but not limited to, a magnetic switch mounted such that operation of the conveyor and/or saw(s) is not possible unless the cover 1001 is installed. A photoelectric detector may also be installed such that the conveyor stops when an object (such as an operator's hand) is sensed at the entrance to the drumette and midwing guides. A cover may also be provided for sprocket 1230. Such a cover may be contoured to accommodate wing holders 1120. That contour may also provide a place for an operator to prestage wings for placing into the wing holders.

While certain preferred embodiments of the wing portioner have been disclosed in detail, it is to be understood that various modifications may be adopted without departing from the spirit of the invention or scope of the following claims.

ELEMENT REFERENCE NUMBERS

First Embodiment

1000 First embodiment of the poultry wing portioner
1001 Safety cover for poultry wing portioner
1100 Conveyor chain for poultry wing portioner 1000
1110 Mounting tabs
1120 Wing holders for poultry wing portioner 1000
1121 Mounting slots on wing holders 1120
1122 Drumette grooves on wing holders 1120
1123 Midwing grooves on wing holders 1120
1124 Drumette side leg on wing holders 1120
1125 Midwing side leg on wing holders 1120
1126 Apices of wing holders 1120
1127 Saw passage slots for wing holders 1120
1128 Bottom surfaces of wing holders 1120
1129 Chain slots for wing holders 1120
1200 Motor for turning drive sprocket 1210
1210 Drive sprocket for chain 1100
1211 Shaft for drive sprocket 1210
1220 Idler sprocket for chain 1100
1230 Idler sprocket for chain 1100
1300 Table for wing portioner 1000
1310 Track in table 1300
1311 Floor of track 1310
1330 Upper slabs of table 1300
1331 Beveled surfaces on upper slab
1340 Lower slab of table 1300
1341 Beveled surface on lower slab
1410 First circular saw blade for poultry wing portioner 1000
1420 Second circular saw blade for poultry wing portioner 1000
1430 Shaft for motor 1440
1440 Motor for driving first and second circular saw blades 1410 and 1420
1500 Frame for wing portioner 1000
1510 Drumette side alignment guide for wing portioner 1000
1511 Inclined portion of drumette side alignment guide 1510
1520 Midwing side alignment guide for wing portioner 1000
1521 Inclined portion of midwing side alignment guide 1520
1620 Alternative wing holder for wing portioner 1000
1621 Mounting slots on wing holders 1620
1622 Drumette grooves on wing holders 1620
1623 Midwing grooves on wing holders 1620
1624 Drumette side legs on wing holders 1620
1625 Midwing side legs on wing holders 1620
1626 Apices of wing holders 1620
1627 Saw passage slots for wing holders 1620
1628 Bottom surfaces of wing holders 1620
1629 Chain slots for wing holders 1620
1630 Wingtip legs on wing holders 1620
1631 Wingtip grooves on wing holders 1620
1632 Saw passage slots for wing holders 1620
1800 Midwing/wingtip divider Second Embodiment 2000 Second embodiment of the poultry wing portioner
2100 Chain for wing portioner 2000
2110 Mounting tab for wing portioner 2000
2120 Wing holder for wing portioner 2000
2127 Saw passage slots for wing holders 2120
2300 Table for wing portioner 2000
2310 Track in table 2300
2311 Floor of track 2310
2330 Upper slabs of table 2300
2340 Lower slab of table 2300
2410 First circular saw blade for poultry wing portioner 2000
2420 Second circular saw blade for poultry wing portioner 2000
2430 Shaft for motor 2440
2440 Motor for driving first and second circular saw blades 2410 and 2420
2500 Frame for wing portioner 2000
2510 Drumette side alignment guide for wing portioner 2000
2511 Inclined portion of drumette side alignment guide 2510
2520 Midwing side alignment guide for wing portioner 2000
2521 Inclined portion of midwing side alignment guide 2520
2710 Upper wingtip alignment guide
2711 Inclined portion of upper wingtip alignment guide 2710
2720 Lower wingtip alignment guide Third Embodiment 3000 Third embodiment of poultry wing portioner
3100 Chain for wing portioner 3000
3110 Mounting tab for wing portioner 3000
3120 Wing holder for wing portioner 3000
3127 Saw passage slots for wing holders 3120
3200 Motor for turning drive sprocket 3210
3210 Drive sprocket for chain 3100
3211 Shaft for drive sprocket 3210
3230 Idler sprocket for chain 3100
3300 Table in wing portioner 3000
3310 Track in table 3300
3311 Floor of track 3310
3330 Upper slabs of table 3300
3340 Lower slab of table 3300
3410 First saw blade for poultry wing portioner 3000
3420 Second saw blade for poultry wing portioner 3000
3430 Shaft for motor 3440
3440 Motor for driving first saw blade 3410
3450 Motor for driving second saw blade 3420
3460 Shaft for motor 3450
3500 Frame for wing portioner 3000
3510 Drumette side alignment guide for wing portioner 3000
3511 Inclined portion of drumette side alignment guide 3510
3520 Alignment guide for midwing side wing portioner 3000
3521 Inclined portion of midwing side alignment guide 3520
3710 Upper wingtip alignment guide
3711 Inclined portion of upper wingtip alignment guide
3712 Horizontal portion of upper wingtip alignment guide
3713 Vertical portion of upper wingtip alignment guide
3714 Midwing/wingtip separator
3720 Lower wingtip alignment guide

The invention claimed is:
1. An apparatus for cutting a poultry wing, the poultry wing having a drumette portion, a midwing portion, and a wingtip portion, the apparatus comprising:

(a) a wing holder for receiving wings, each wing holder adapted to receive a poultry wing;
(b) a continuous loop conveyance device for moving the wing holders through a continuous path, wherein the wing holder is mounted on the continuous loop device;
(c) a first driving means for driving the continuous loop conveyance device;
(d) a first circular saw for cutting the joint between the drumette portion and the midwing portion;
(e) a second circular saw for cutting a joint between the midwing portion and the wingtip portion;
(f) a second driving means for rotating the first circular saw and the second circular saw; and
(g) an alignment device forming a corridor for aligning the poultry wing on the wing holder prior to the joint between the drumette portion and the midwing portion being cut.

2. The apparatus according to claim 1, further comprising a track within which the wing holder travels through a portion of the continuous path.

3. The apparatus according to claim 2, wherein the track is in a dovetail shape for receiving a portion of the wing holder.

4. The apparatus according to claim 1, wherein the wing holder includes a drumette groove and a midwing groove.

5. The apparatus according to claim 1, wherein the wing holder includes a wingtip leg.

6. An apparatus for cutting a poultry wing, the poultry wing having a drumette portion, a midwing portion, and a wingtip portion, the apparatus comprising:
(a) a wing holder for receiving wings, each wing holder configured to receive a poultry wing;
(b) a continuous loop conveyance device for moving the wing holder through a continuous path, wherein the wing holder is mounted on the continuous loop device;
(c) a first driving means for driving the continuous loop conveyance device;
(d) a first circular saw for cutting the joint between the drumette portion and the midwing portion;
(e) a second circular saw for cutting a joint between the midwing portion and the wingtip portion;
(f) a second driving means for rotating the first circular saw and the second circular saw; and
(g) an alignment device forming a corridor for aligning the poultry wing on the wing holder prior to the joint between the drumette portion and the midwing portion being cut.

7. The apparatus according to claim 6, further comprising a track within which the wing holder travels through a portion of the continuous path.

8. The apparatus according to claim 7, wherein the track is in a dovetail shape for receiving a portion of the wing holder.

9. The apparatus according to claim 6, further comprising a second alignment device, the second alignment device forming a corridor for aligning the midwing portion and the wingtip portion of the poultry wing after cutting the joint between the drumette portion and the midwing portion and before cutting the joint between the midwing portion and the wingtip portion.

10. The apparatus according to claim 6, wherein the wing holder includes a drumette groove and a midwing groove.

11. The apparatus according to claim 6, wherein the wing holder includes a wingtip leg.

12. The apparatus according to claim 6, wherein the apparatus is configured such that the joint between the drumette portion and the midwing portion is cut prior to cutting the joint between the midwing portion and the wingtip portion.

13. An apparatus for cutting a poultry wing, the poultry wing having a drumette portion, a midwing portion, and a wingtip portion, the apparatus comprising:
(a) a wing holder for receiving wings, each wing holder adapted to receive a poultry wing;
(b) a continuous loop conveyance device for moving the wing holders through a continuous path, wherein the wing holder is mounted on the continuous loop device;
(c) a first driving means for driving the continuous loop conveyance device;
(d) a first circular saw for cutting the joint between the drumette portion and the midwing portion;
(e) a second driving means for rotating the first circular saw;
(f) a second circular saw for cutting a joint between the midwing portion and the wingtip portion;
(g) a third driving means for rotating the second circular saw; and
(h) a first alignment device forming a corridor for aligning the poultry wing on the wing holder prior to the joint between the drumette portion and the midwing portion being cut.

14. The apparatus according to claim 13, further comprising a track within which the wing holder travels through a portion of the continuous path.

15. The apparatus according to claim 13, further comprising a second alignment device forming a corridor for aligning the midwing portion and the wingtip portion of the poultry wing after cutting the joint between the drumette portion and the midwing portion and before cutting the joint between the midwing portion and the wingtip portion.

16. The apparatus according to claim 13, further comprising an enclosure configured to segregate midwing portions and wingtip portions after the wingtip portions are severed from the midwing portions.

17. The apparatus according to claim 13, wherein the wing holder includes a drumette groove and a midwing groove.

18. The apparatus according to claim 13, wherein the wing holder includes a wingtip leg.

19. The apparatus according to claim 13, wherein the apparatus is configured such that the joint between the drumette portion and the midwing portion is cut prior to cutting the joint between the midwing portion and the wingtip portion.

* * * * *